United States Patent [19]

McIntyre

[11] Patent Number: 5,530,512

[45] Date of Patent: Jun. 25, 1996

[54] AUTOFOCUS CAMERA

[75] Inventor: Dale F. McIntyre, Honeoye Falls, N.Y.

[73] Assignee: Eastman Kodak Company, Rochester, N.Y.

[21] Appl. No.: 332,216

[22] Filed: Oct. 31, 1994

[51] Int. Cl.[6] .................................................. G03B 13/36
[52] U.S. Cl. .............................................. 354/400; 354/76
[58] Field of Search ............................... 354/400, 76, 402

[56] References Cited

U.S. PATENT DOCUMENTS

| | | | |
|---|---|---|---|
| 2,642,790 | 6/1953 | Scholkemeier | 95/44 |
| 2,701,500 | 2/1955 | Schwartz et al. | 88/2.4 |
| 3,008,398 | 11/1961 | Sanborn | 95/44 |
| 3,442,193 | 5/1969 | Pagel | 95/44 |
| 4,963,017 | 10/1990 | Schneiter et al. | 356/1 |
| 5,059,019 | 10/1991 | McCullough | 352/131 |
| 5,189,463 | 2/1993 | Capper et al. | 354/403 |

FOREIGN PATENT DOCUMENTS

| | | |
|---|---|---|
| 2252836A | 8/1992 | United Kingdom . |
| WO93/13452 | 7/1993 | WIPO . |

*Primary Examiner*—W. B. Perkey
*Attorney, Agent, or Firm*—David A. Howley

[57] ABSTRACT

A camera includes an autofocus system which receives radiation reflected at least from a predetermined portion of a scene to be photographed to focus a taking lens with respect to the scene. The camera further includes a laser for impinging a visible light-spot on the scene to ensure the taking lens is pointed towards the scene. The laser is constructed to impinge the visible light-spot on the scene only within the predetermined portion of the scene. The autofocus system includes manually operable means for operating the autofocus system independent of the aiming means.

1 Claim, 3 Drawing Sheets

AUTOFOCUS CAMERA

CROSS-REFERENCE TO RELATED APPLICATIONS

Reference is made to commonly assigned copending application Ser. Nos. 08/277,151, entitled Multispot Autofocus System Usable With an Image Recording Apparatus and filed in the name of Meyers, 08/242,891, entitled Camera with Pointing Aid and filed in the name of McIntyre and Ser. No. 08/201,597, entitled Camera Focusing System with Designator and filed in the name of Meyers, each of which are assigned to the assignee of this application.

FIELD OF THE INVENTION

The invention relates generally to the field of photography, and in particular to cameras. More specifically, the invention relates to an autofocus camera which emits visible light towards a scene to indicate what portion of the scene the camera is focusing on.

BACKGROUND OF THE INVENTION

In a typical autofocus camera, a sensor in the camera detects light (or sound) reflected from the scene in order to determine the distance to the scene. The reflected light can be ambient light and/or light (e.g. infrared light) which is emitted from the camera itself. Once the distance to the scene is determined, the lens system in the camera is adjusted to focus the camera at the scene distance. In order to determine which portion of the scene the autofocus system is sensing, a camera user must look through the camera viewfinder and observe fiducial marks. This portion of the scene is not necessarily the center of the scene. As such, the camera operator is constrained to look through the viewfinder in order for the autofocus system to focus the camera on the desired scene portion.

PCT published application WO 93/13452 discloses a camera having a light source that produces a beam of light extending in the direction the camera is aimed. A light pattern produced by reflection of the beam of light by an object informs the user where the camera is aimed. Actuation of a shutter trigger deactivates the light source and then actuates a shutter mechanism in the camera, with the camera at this time being properly aimed. The shutter trigger may also actuate an autofocus system.

As such, a camera user is not constrained to look through a camera view finder to aim the camera. However, there is no disclosure in WO 93/13452 that the light pattern indicates which portion of a scene the autofocus system is sensing. Therefore, the camera operator will still be required to look through the viewfinder in order for the autofocus system to focus the camera on the desired portion of the scene. As a result, the benefit of not having to look through the viewfinder to aim the camera is lost in the autofocus embodiment disclosed in WO 93/13452.

In the above cross-referenced applications 08/277,151 and 08/201,597, the visible light emitter (pointer) is part of the autofocus system. As such, the autofocus system requires that the visible light emitter emit light in order to properly function. However, in some situations it may be desirable to shut off the visible light emitter while still utilizing the autofocus system. Such shutting off of the visible light emitter while still being able to utilize the autofocus system is not provided for in 08/277,151 and 08/201,597.

SUMMARY OF THE INVENTION

The present invention is directed to overcoming one or more of the problems set forth above. Briefly summarized, according to one aspect of the present invention, a camera includes an autofocus system which receives radiation reflected at least from a predetermined portion of a scene to be photographed to focus a taking lens with respect to the scene. The camera further includes aiming means for impinging a visible light-spot on the scene to ensure the taking lens is pointed towards the scene. The aiming means is constructed to impinge the visible light-spot on the scene only within the predetermined portion of the scene. The autofocus system includes manually operable means for operating the autofocus system independent of the aiming means.

By indicating with visible light which portion of a scene the autofocus system is sensing, the camera frees the operator from having to look through the viewfinder to insure the camera is properly focused. Additionally, because the autofocus system is operable independent of the visible light emitter, the light emitter can be shut off without effecting the operation of the autofocus system.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
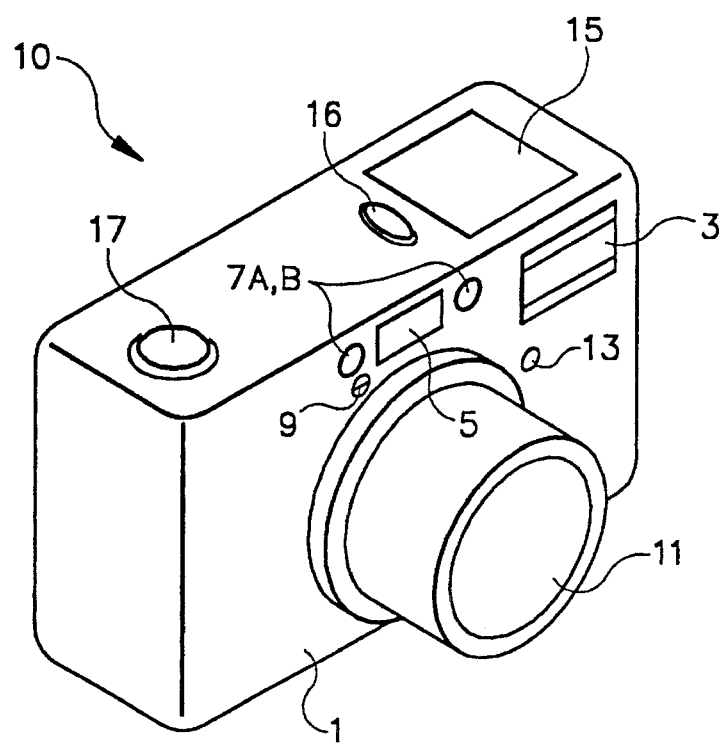
FIG. 1 is a schematic perspective view of a camera incorporating the present invention.

Beginning with FIG. 1, a camera 10 includes a camera body 1, an objective lens 11 and a flash assembly 3 for artificially illuminating a scene to be recorded. The camera further includes an exposure cell 13 used to measure the quantity of ambient light for exposure control and a viewfinder 5 used by the camera operator to determine the scene which will be recorded by the camera. A mode select button 16 is utilized to select from various operating modes of the camera. A liquid crystal display (LCD) 15 provides various information to the camera user such as the number of remaining unexposed photographic film frames, the mode(s) selected, etc.

An active autofocus system includes a radiation emitter 7A and a radiation detector 7B for detecting radiation emitted from emitter 7A and reflected back to camera 10 by a portion of the scene to be recorded. Emitter 7A is preferably a light emitting diode which emits light in the infrared wavelength band. As such, the emitted light is not visible to the unaided human eye. Detector 7B is preferably a photodiode which is selected to be most sensitive to infrared light. The autofocus system can be, for example, a triangulation autofocus system in which the angle of the reflected infrared light relative to camera 10 is used to calculate the camera to scene distance.

A visible light emitter 9, preferably a laser diode, emits a highly collimated, visible beam of light for indicating to a camera operator both where camera 10 is aimed and what portion of a scene the autofocus system is sensing. A two-stage shutter button 17 is utilized to activate the autofocus system, activate the visible light emitter and commence an image capture sequence to record an image of the scene on photographic film or an electronic sensor within camera 10.

Figure 2:
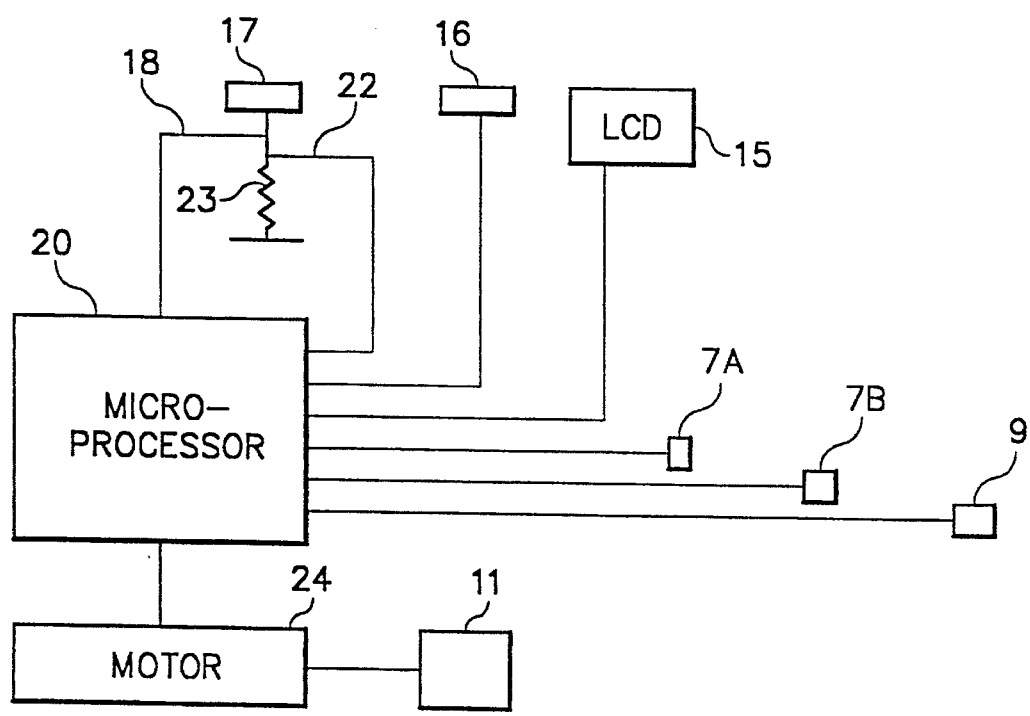
FIG. 2 is a block diagram of the operational aspects of the camera of FIG. 1.

Turning now to FIG. 2, the operation of camera 10 will be explained. When a camera operator desires to record a scene, the camera operator presses shutter button 17 to a partially closed position, contacting a switch 18. Closure of switch 18 informs a microprocessor 20 that the shutter button has been partially closed. Microprocessor 20 then instructs radiation emitter 7A to momentarily emit infrared radiation and detector 7B to measure the angle of the infrared radiation, relative to the camera, reflected back from the scene. Based on this angle, microprocessor 20 calculates a camera to scene distance and operates a motor 24 to move lens 11 to a position where the scene will be in focus.

The microprocessor also instructs visible light emitter 9 to emit visible light towards the scene such that the camera operator will know both where the camera is aimed and which portion of the scene the autofocus system is sensing without having to look through viewfinder 5. Once the camera operator is positive the camera is focused on the desired portion of the scene, the operator fully presses shutter button 17 to close a second switch 22. Microprocessor 20 now causes the camera to commence an image recording sequence well known to those skilled in the art. A compression spring 23 returns shutter button 17 to its position shown in FIG. 2 as the camera operator releases the shutter button.

Briefly, microprocessor 20 first shuts off visible light emitter 9 so that the visible light, for example a red dot, will not show up in the resulting photograph. A camera shutter is then opened to a certain aperture and for a certain length of time to expose the film. The aperture and length of exposure depend on the film speed and the ambient light conditions. The aperture is then closed and the film is advanced to move an unexposed section of film into the cameras optical path.

In certain situations, a camera operator may wish to utilize the autofocus system but not use visible light emitter 9 to identify where the autofocus system is focusing in the scene. For example, if a large number of photographers are taking a picture of the same scene, to use visible light emitter 9 could possibly cause a red dot to show up in the other photographers pictures. In order to shut off visible light emitter 9, a camera operator presses mode select button 16 until an icon appears on LCD 15 indicating that visible light emitter 9 has been turned off. Microprocessor 20 consequently will not operate visible light emitter 9 again until the camera operator has reselected the visible light emitter feature with mode button 16.

Figure 3:
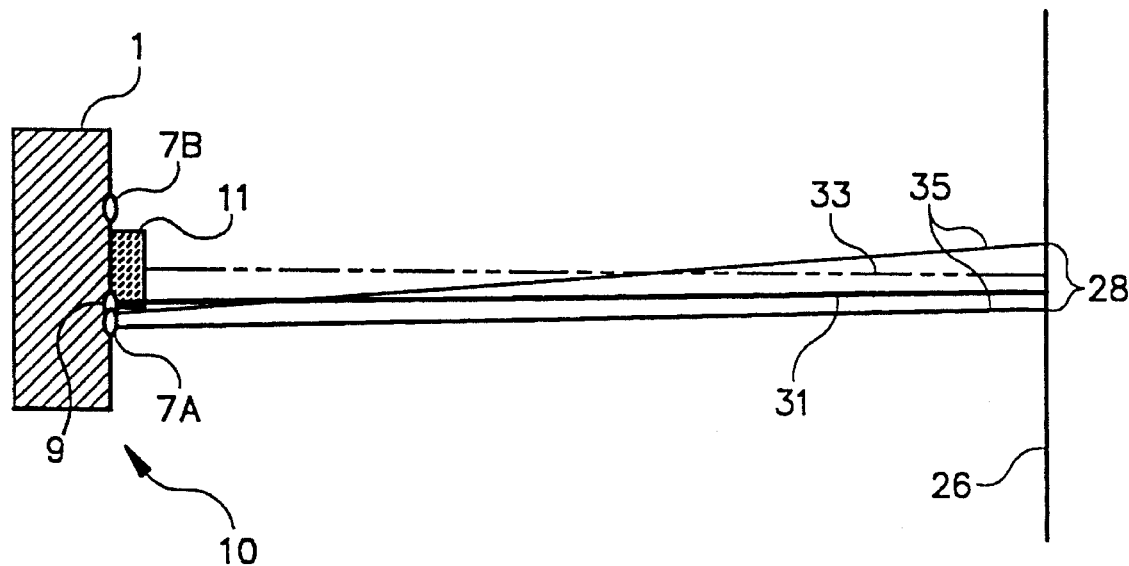
FIG. 3 is a top view of the camera of FIG. 1.

Referring to FIG. 3, emitter 7a emits an expanding cone of infrared radiation 35 towards scene 26. Reference numeral 33 identifies the camera's optical axis. Infrared radiation 35 is incident on scene 26 at a portion 28 of scene 26. Visible light emitter 9 emits a highly collimated visible beam of radiation 31. Emitter 9 and emitter 7A are constructed and aligned such that visible radiation 31 also is incident on portion 28 of scene 26. As such, a camera operator can view visible radiation 31 reflected from scene portion 28 and know that the autofocus system is focusing on scene portion 28, without having to look through the camera viewfinder.

Figure 4:
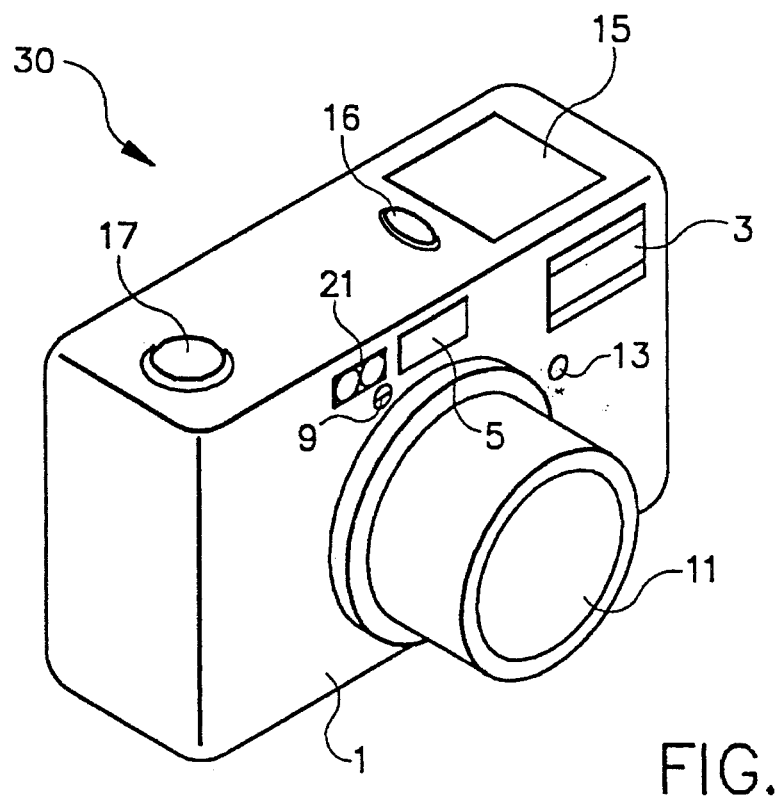
FIG. 4 is a second embodiment of a camera incorporating the present invention.

Proceeding to FIG. 4, a second embodiment of the present invention is displayed in a passive autofocus camera 30. Camera 30 is similar to camera 10 except that emitter 7A and detector 7B have been replaced with a passive autofocus sensor 21. Such a passive autofocus system does not emit its own radiation but instead relies on ambient radiation reflected from the scene to be photographed. One example is a passive through-the-lens (TTL) autofocus system, well known to those skilled in the art, which utilizes scene light that is imaged through a taking lens, a field lens and a pair of separation lenses onto a linear photosensitive array. The resultant pair of images on the array generates a pair of electrical signals which are processed through a correlation algorithm to determine the distance along the linear array between the peak values of the pair of electrical signals. This distance is representative of the focus state of the camera's taking lens allowing the camera's microprocessor to cause the taking lens to be moved to the desired focus position.

Another example of a passive autofocus system, disclosed in above-referenced application Ser. No. 08/201,597, uses a pair of lenses, one which focuses scene light in front of an image sensor and the other of which focuses scene light behind the image sensor. This results in a pair of "blur-circles" on the image sensor. The objective lens is moved to a position where the size of the blur circles are equivalent, at which position the objective lens is focused on the scene.

Figure 5:
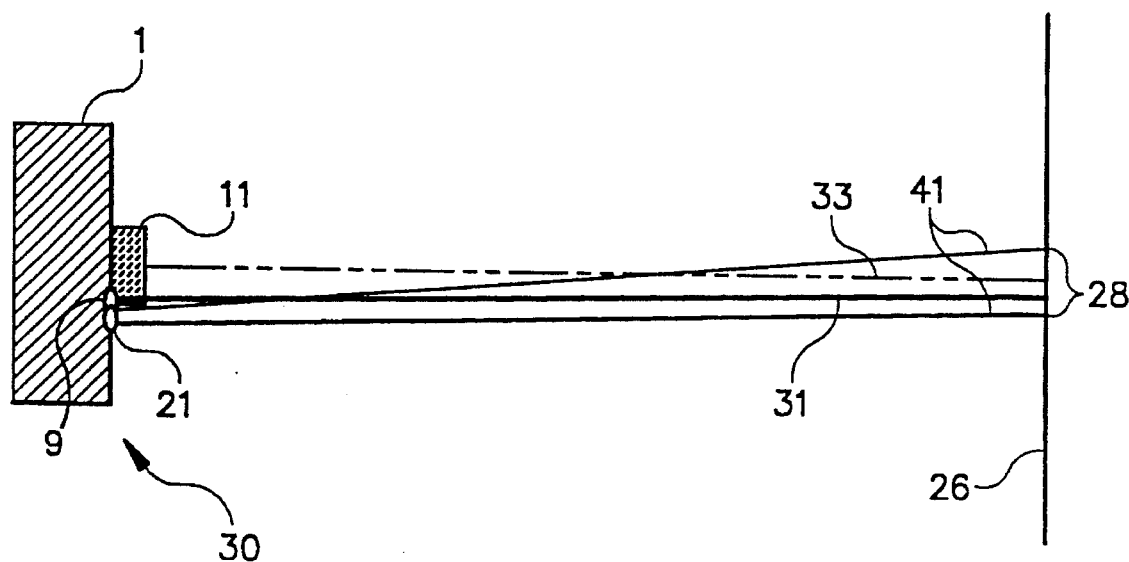
FIG. 5 is a top view of the camera of FIG. 4.

As shown in FIG. 5, ambient light 41 reflected from scene portion 28 is incident on sensor 21. Visible light emitter 9 is constructed and aligned such that visible light beam 31 is incident on scene portion 28. As such, a camera operator can view visible radiation 31 reflected from scene portion 28 and know that the autofocus system is focusing on scene portion 28, without having to look through the camera viewfinder.

Figure 6:
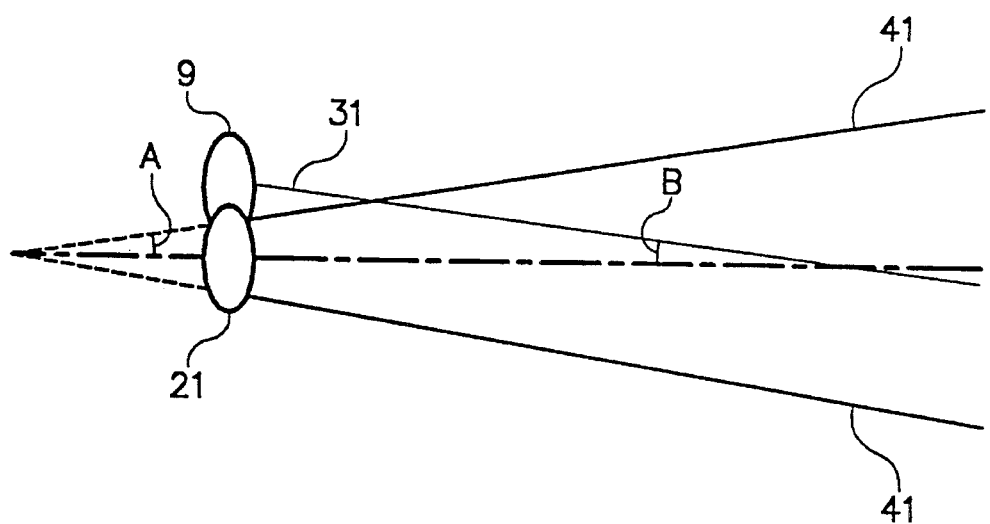
FIG. 6 is a side view of a portion of the camera shown in FIG. 4.

Turning now to FIG. 6, it is preferable that visible light emitter 9 and sensor 21 (or 7A) be aligned such that once visible light beam 31 enters the cone of ambient light 41, the visible light beam 31 will stay within the cone of ambient light 41. Such a result can be assured by angle A being the same as or greater than an angle B. This arrangement will insure that once the visible light beam is within the cone of light used by the autofocus system, the visible light beam will be able to identify the portion of the scene being focused on regardless of the camera scene distance.

The invention has been described with reference to a preferred embodiment. However, it will be appreciated that variations and modifications can be effected by a person of ordinary skill in the art without departing from the scope of the invention.

PARTS LIST 1 camera body
3 flash assembly
5 viewfinder
7A radiation emitter
7B radiation detector
9 visible light emitter
10 camera
11 objective lens
13 exposure cell 15 liquid crystal display
16 mode select button
17 two-stage shutter button
18 switch
20 microprocessor
21 passive autofocus sensor
22 switch
23 compression spring
24 motor
26 scene
28 scene portion
30 passive autofocus camera
31 visible radiation
35 infrared radiation
41 ambient light
A,B Angles

I claim:

1. A camera comprising an autofocus system which receives radiation reflected at least from a predetermined portion of a scene to be photographed to focus a taking lens with respect to the scene, and aiming means for impinging a visible light-spot on the scene to ensure said taking lens is pointed towards the scene, is characterized in that:

said aiming means is constructed to impinge the visible light-spot on the scene only within said predetermined portion of the scene; and said autofocus system includes manually operable means for operating the autofocus system independent of said aiming means, said manually operable means including (A) a shutter button for activating the aiming means, autofocus system and a picture taking sequence, and (B) a mode button operable to deselect the aiming means such that the shutter button can be operated to activate the autofocus system and a picture taking sequence to record an image without activating the aiming means.

* * * * *